(12) United States Patent
Farjon

(10) Patent No.: US 9,257,051 B2
(45) Date of Patent: Feb. 9, 2016

(54) AIRCRAFT AVOIDANCE METHOD AND DRONE PROVIDED WITH A SYSTEM FOR IMPLEMENTING SAID METHOD

(71) Applicant: SAGEM DEFENSE SECURITE, Boulogne Billancourt (FR)

(72) Inventor: Julien Farjon, Boulogne Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/398,663

(22) PCT Filed: Apr. 24, 2013

(86) PCT No.: PCT/EP2013/058553
§ 371 (c)(1),
(2) Date: Nov. 3, 2014

(87) PCT Pub. No.: WO2013/164237
PCT Pub. Date: Nov. 7, 2013

(65) Prior Publication Data
US 2015/0134150 A1     May 14, 2015

(30) Foreign Application Priority Data

May 2, 2012   (FR) ...................... 12 54032

(51) Int. Cl.
*G01C 22/00*         (2006.01)
*G01S 3/02*          (2006.01)
*G08G 5/04*          (2006.01)
(Continued)

(52) U.S. Cl.
CPC .............. *G08G 5/045* (2013.01); *B64C 39/024* (2013.01); *G01S 13/92* (2013.01); *G01S 13/9303* (2013.01); *G05D 1/0202* (2013.01); *G08G 5/0008* (2013.01); *G08G 5/0069* (2013.01); *B64C 2201/141* (2013.01)

(58) Field of Classification Search
CPC . G01S 13/9303; G01S 13/765; G01S 5/0072; G01S 13/865; G01S 13/91; G01S 2205/003; G01S 13/781; G01S 13/782; G01S 13/86; G01S 7/006; G01S 11/12; G01S 19/10; G01S 19/18; G01S 19/20; G01S 19/02
USPC .......... 701/3, 301, 23, 28; 340/961, 945, 974; 342/27, 30, 29, 55, 455, 63
See application file for complete search history.

(56) References Cited

U.S. PATENT DOCUMENTS 5,581,250 A * 12/1996 Khvilivitzky ........... G01S 11/12
                                                    340/945
6,278,396 B1 * 8/2001 Tran ..................... G01S 13/9303
                                                     342/29
(Continued)

*Primary Examiner* — Muhammad Shafi
(74) *Attorney, Agent, or Firm* — Muncy, Geissler, Olds & Lowe, P.C.

(57) ABSTRACT

A method enabling an aerial drone not having a TCAS system to avoid an intruder aircraft, the method including the steps of acquiring the position of the intruder aircraft in order to determine the distance between the aerial drone and the intruder aircraft, measuring the angular speed of the intruder aircraft in a horizontal plane, and determining whether the intruder aircraft is fitted with a TCAS system, and, if so, receiving a resolution advisory transmitted by the TCAS of the intruder aircraft and following a previously-determined avoidance path. The invention also provides a drone fitted with a system implementing the method.

6 Claims, 5 Drawing Sheets

(51) Int. Cl.
*G01S 13/93* (2006.01)
*G01S 13/92* (2006.01)
*G08G 5/00* (2006.01)
*G05D 1/02* (2006.01)
*B64C 39/02* (2006.01)

(56) References Cited

U.S. PATENT DOCUMENTS

| | | | |
|---|---|---|---|
| 7,864,096 B2* | 1/2011 | Stayton | G08G 5/0008 342/29 |
| 2003/0233192 A1* | 12/2003 | Bayh et al. | 701/301 |
| 2005/0024256 A1* | 2/2005 | Ridderheim | G01S 5/12 342/29 |
| 2006/0058931 A1* | 3/2006 | Ariyur | G05D 1/0257 701/23 |
| 2009/0027253 A1 | 1/2009 | Van Tooren et al. | |
| 2010/0100308 A1* | 4/2010 | Coulmeau | G08G 5/006 701/122 |
| 2010/0292871 A1 | 11/2010 | Schultz et al. | |
| 2011/0118980 A1 | 5/2011 | Hoy | |
| 2011/0160950 A1* | 6/2011 | Naderhirn et al. | 701/28 |
| 2011/0163908 A1* | 7/2011 | Andersson et al. | 342/36 |
| 2011/0169684 A1* | 7/2011 | Margolin | G01S 5/12 342/30 |

* cited by examiner

AIRCRAFT AVOIDANCE METHOD AND DRONE PROVIDED WITH A SYSTEM FOR IMPLEMENTING SAID METHOD

The present invention relates to collision avoidance between aircraft and more particularly to a method of determining an aircraft avoidance path compatible with the airborne collision avoidance systems (ACASs) that are fitted to civilian commercial aircrafts.

The invention also relates to a drone provided with a system for performing a method of determining a path for avoiding a piloted aircraft.

STATE OF THE ART

An aerial drone is an aircraft without a human pilot on board. The aircraft may be provided with automatic systems for performing its flight in autonomous manner, and it may also be provided with sensors and be remotely controlled by pilot on the ground. Aerial drones are in ever-increasing use in the military sphere, in Particular for battlefield surveillance, reconnaissance, or indeed ground attack.

Proposals have been made to use such drones in the civilian sphere for performing surveillance or reconnaissance missions. Such drones are advantageous since they have great flight endurance, but they suffer from poor maneuverability, particularly concerning their ability to climb or descend. The absence of a pilot on board means that a drone cannot satisfy the flight rules that are in force in civilian airspace, which rules require in particular that an aircraft must be capable of performing a "see and avoid" function in order to avoid collisions. As a result, drones are not authorized to fly in non-segregated airspace, i.e. in the same locations and at the same time as civilian aircraft having a human pilot on board.

An anti-collision system is known for fitting to certain piloted aircraft that are authorized to fly on instruments. That system is known as the traffic collision avoidance system (TCAS) and it corresponds to the ACAS standard defined by the convention on international civil aviation. In Europe, all commercial airplanes having more than nineteen passenger seats are required to be fitted with Version II of that system that incorporates a mode S transponder. The system is arranged to collect information concerning the heading and the position of all aircraft situated at a distance lying in the range 2.5 miles (4 kilometers (km)) to 30 miles (48 km). This information mainly comprises the distance to such aircraft, their pressure altitudes, and approximate azimuth information. The aircraft that are detected are referred to as "intruder aircraft". The information is recovered by interrogating the transponder of the intruder aircraft, which transponder may be a mode S or a mode S type transponder, and the information is used by the TCAS II system for determining whether a collision is possible with the intruder aircraft. The term "collision" should be understood as meaning that the aircraft will cross each other at a distance closer than criteria having values that are previously input into the system. Priority is given to the TCAS II system (then referred to as the "master" TCAS system) of the first aircraft to enter into contact with the TCAS II system (then referred to as the "slave" TCAS system) of the other aircraft. In the event of a potential collision being detected by the TCAS system, the pilot of each aircraft is informed by an audible alert issued in the cockpit. Such an alert is known as a "traffic advisory". If, following such an alert, the risk of collision is not reduced and collision appears to be imminent, then the master TCAS determines the avoidance maneuver that is to be performed by the aircraft to which it is fitted and it transmits a resolution advisory containing this information to the slave TCAS which in turn determines a compatible avoidance maneuver. Each resolution advisory (RA) is also transmitted to the concerned pilot via a display included in the navigation instruments and it is backed up by an audible alert. The advisory specifies the intruder aircraft that corresponds to the alert and also gives a maneuvering order to the pilot: maintain the present path, climb, descend, or monitor vertical speed. When the slave TCAS has received the RA from the master TCAS, it sends a compatible maneuver order to its own pilot. In most situations, the TCAS II system recommends one of the aircraft to climb and the other to descend, thereby having the effect of increasing the separation distance between the two aircraft very quickly. In order to operate well, the TCAS II system requires the aircraft that are fitted therewith to have some minimum level of performance in terms of climb or descent rate.

The poor maneuverability of drones in terms of climbing and descending, and also the absence of a pilot capable of interpreting the instructions of the TCAS II system, means that is not possible to allow aerial drones to travel in non-segregated airspace, and is therefore slowing down the extension of drone use to spheres such as civilian surveillance, fire prevention, or road safety. Improving the maneuverability of drones to comply with the levels required for performing the avoidance maneuvers specified by the TCAS system would increase the weight and the cost of such aircraft and would degrade the essential performance characteristics of such aircraft, specifically in terms of endurance, minimum flying speed, noise, and fuel consumption.

Object of the Invention

An object of the invention is to provide a drone with a "see and avoid" function, i.e. to give it the ability to avoid a collision with an intruder aircraft.

SUMMARY OF THE INVENTION

To this end, the invention provides a method enabling an aerial drone not having a TCAS system to avoid an intruder aircraft, the method comprising the steps of acquiring the position of the intruder aircraft in order to determine the distance between the aerial drone and the intruder aircraft;

measuring the angular speed of the intruder aircraft in a horizontal plane; and determining whether the intruder aircraft is fitted with a TCAS system, and, if so, receiving a resolution advisory transmitted by the TCAS of the intruder aircraft and determining an avoidance path.

This method thus enables an aerial drone to detect and avoid an intruder aircraft.

In a particularly advantageous implementation, the avoidance path may be determined in a horizontal plane, thus allowing a drone of maneuverability that does not enable it to apply TCAS orders, to be able to avoid in complete safety an aircraft that is fitted with a TCAS system and that is applying the order recommended thereby, whatever that order might be.

The invention also provides a drone provided with a flight control system arranged to perform the avoidance method of the invention.

BRIEF DESCRIPTION OF THE FIGURES

Reference is made to the accompanying figures, in which.

DETAILED DESCRIPTION OF AT LEAST ONE IMPLEMENTATION OF THE INVENTION

Figure 1:
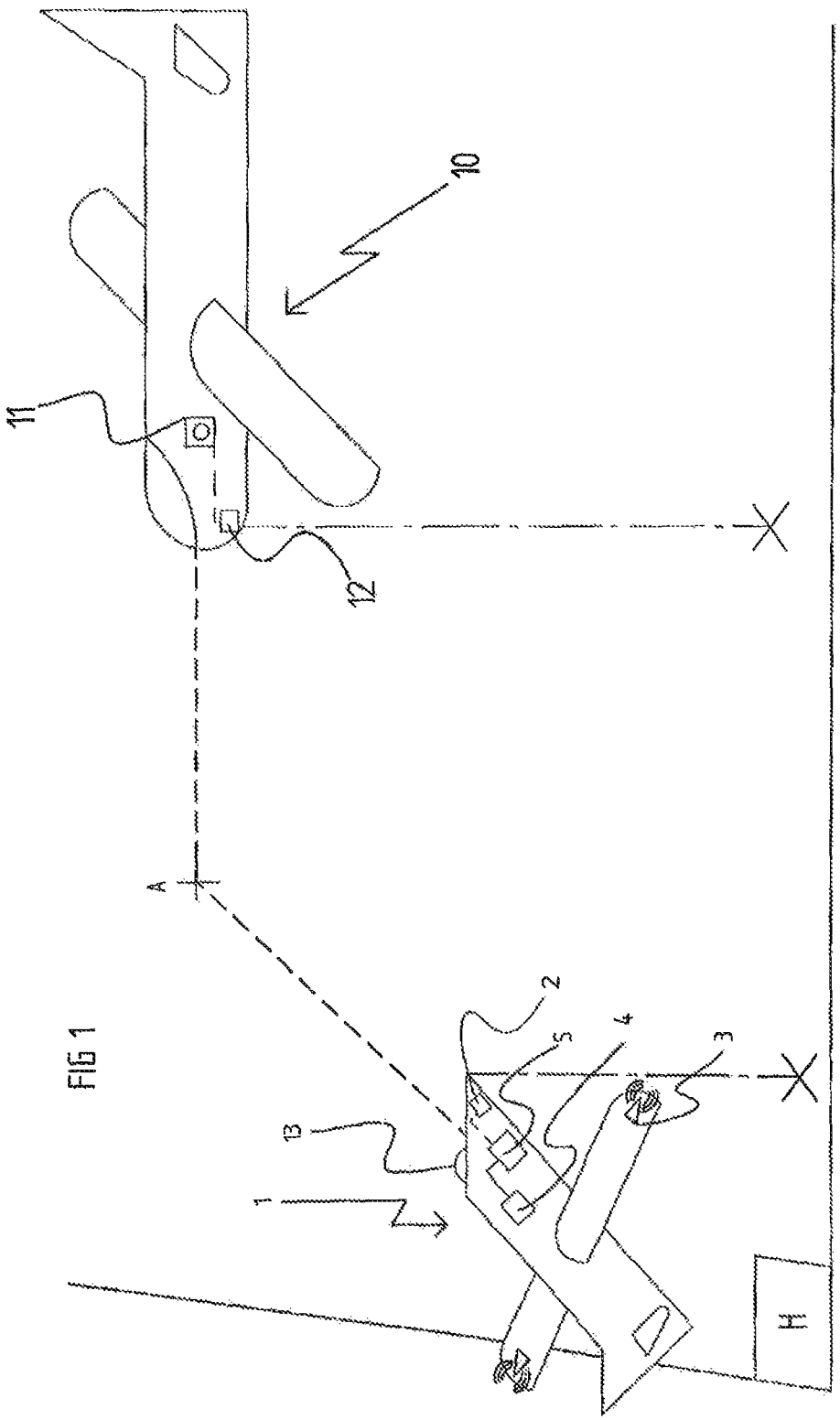
FIG. 1 is a diagrammatic perspective view of a crossing situation between an aircraft and a drone of the invention.

With reference to FIG. 1, the aerial drone of the invention, given overall reference 1, is an airplane including a mode S transponder 2, a transponder interrogator 13, two antennas 3 with direction-finding ability each placed on a respective one of the wings of the drone 1, and an automatic data analysis system 4 connected to a flight control system 5 including in particular a computer.

The drone 1 is following a heading that crosses, at a point A, the flight path of an intruder airplane 10 that is provided with a TCAS II system, given reference 11 in the figure, in association with a mode S transponder 12. FIG. 1 includes a representation of a horizontal plane H having the positions of the two aircraft 1 and 10 projected thereon.

The automatic data analysis system 4 has a computer calculation unit arranged to execute a computer program for performing a method of determining an avoidance path.

Figure 2:
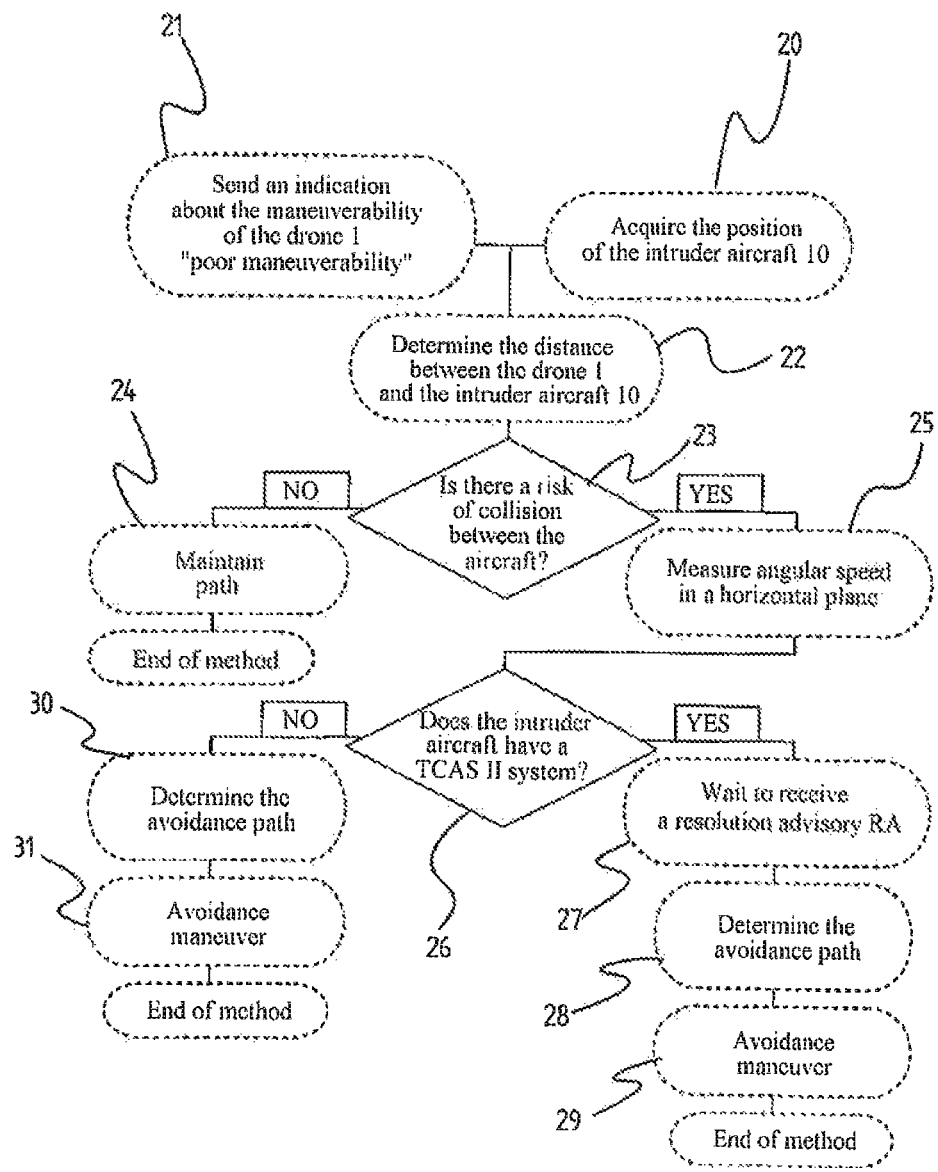
FIG. 2 is a flow chart of events triggered by detecting an intruder airplane in a first implementation of the invention.
Figure 3:
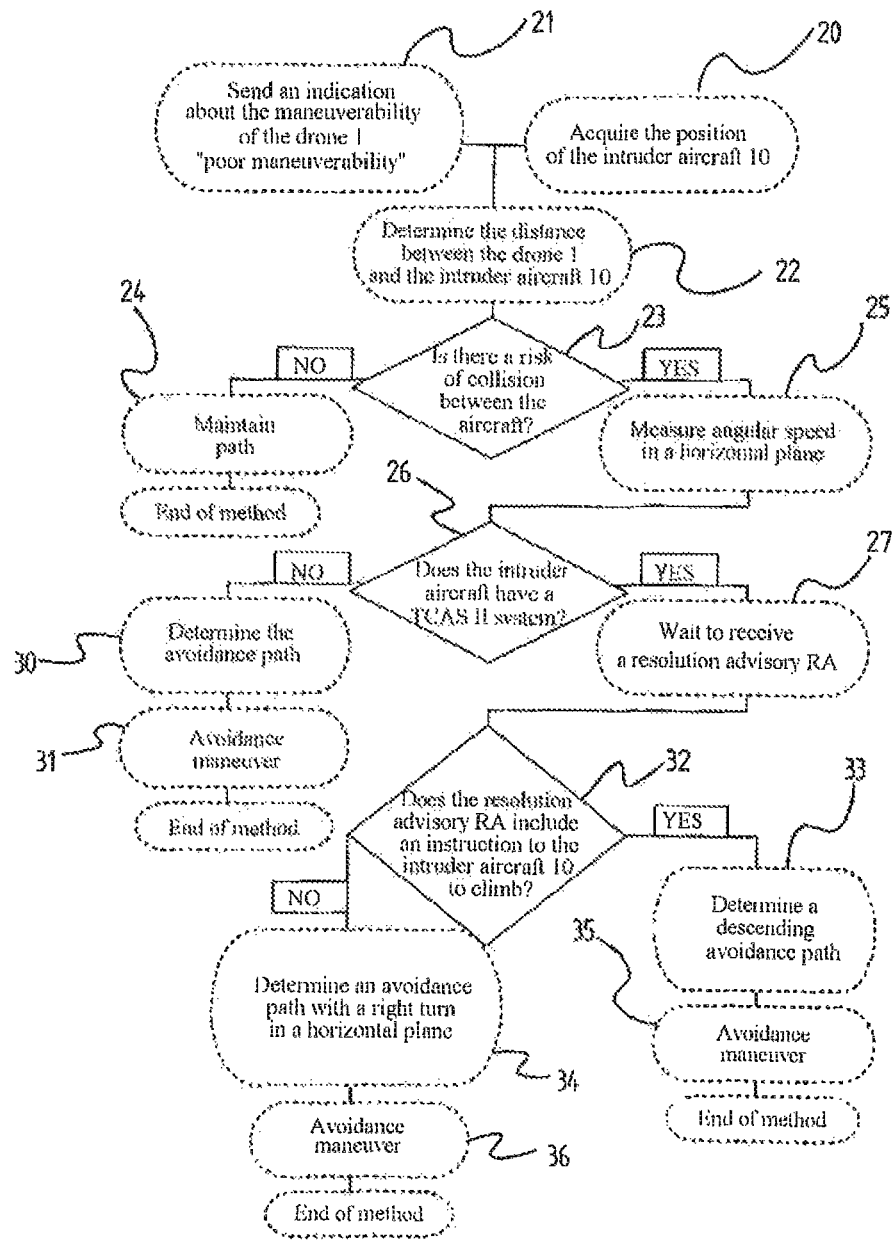
FIG. 3 is a flow chart of events triggered by detecting an intruder aircraft in a second implementation of the invention.

With reference to FIGS. 2 and 3, there follows a description of the method used by the drone 1 to determine a path for avoiding the airplane 10. In these flow charts, oblong shapes represent instructions prepared by the data analysis system 4 to the drone 1, and lozenges represent logic operations performed by the analysis system 4.

On entry of the intruder airplane 10 into the zone in which the intruder airplane 10 receives the signals from the mode S transponder 2 of the drone 1, the drone receives information about the position and the heading of the intruder airplane 10 in response to a message transmitted by its transponder 2. This corresponds to step 20 in the flow chart. In parallel with receiving this information, the drone 10 transmits a message specifying its maneuver ability (step 21). In this example the drone specifies "poor maneuverability".

The information relating to the intruder airplane 10 is processed by the data analysis system 4, which then determines the distance between the drone 1 and the intruder airplane 10 (step 22) and whether or not there exists a risk of collision (step 23).

If no risk of collision is detected, then the drone maintains its initial path (step 24).

If there is a risk of collision, the analysis system 4 performs accurate measurement of the angular travel speed of the airplane 10 relative to the drone 1 in the horizontal plane H with the help of its direction-finding antennas 3 (step 25). Determining the position of a vehicle that is transmitting radio waves by using radio means such as direction-finding antennas is a known technique.

Once this angular speed has been acquired, the analysis system 4 determines whether the airplane 10 has a TCAS II system (step 26). This is done by receiving or not receiving a response from the airplane 10 to the first interrogation from the transponder 2 of the drone 1.

If the system detects that the airplane 10 has a TCAS II system, then the system 4 waits for a resolution. advisory RA to be transmitted. (step 27) by the TCAS II system of the airplane 10 in order to determine the avoidance path (step 28) and send it for execution to the flight control system 5 of the drone 1 (step 29). The maneuver corresponding to the avoidance path determined by the system 4 after the transmission of the resolution advisory RA by the intruder airplane 10 in order to avoid disturbing the operation of the TCAS II. A maneuver performed before the TCAS II of the intruder airplane 10 has determined an anti-collision solution runs the risk of degrading the monitoring function of the TCAS II system. Thus, the avoidance path as determined by the drone 1 is executed at the same time as the avoidance maneuver corresponding to the resolution advisory RA given by the TCAS II of the airplane 10. Since the resolution advisory RA given by the TCAS II of the intruder airplane 10 involves vertical avoidance (an instruction to climb or to descend), the avoidance path determined by the data analysis system 4 is advantageously contained in a horizontal plane, in a direction that takes account of the angular speed of the intruder airplane 10 and also of its position at the moment the resolution advisory RA is transmitted. This path makes it possible to ensure that the two aircraft move apart rapidly, while guaranteeing that these two maneuvers taking place simultaneously cannot lead to a collision, since these maneuvers take place in directions lying in planes that are orthogonal.

If the intruder airplane 10 does not response to the first interrogation by the transponder 2 of the drone 1, the data analysis system 4 interprets this as meaning that the intruder airplane 10 does not have TCAS TI system and it then determines the avoidance path (step 30) for executing as soon as possible by the flight control system 5 (step 31). This avoidance path may include maneuvers in a vertical plane and/or in a horizontal plane. In a particularly advantageous implementation, the avoidance path comprises turning right in a horizontal plane. This maneuver is in compliance with air traffic regulations applicable to visual flight rules (VFR) flight and corresponds to the expected reaction of a conventional aircraft under such conditions.

It should be observed that in this embodiment, the content of the resolution advisory RA is ignored, and it is only the transmission of the resolution advisory that is taken into account in the method.

Another implementation of the method of the invention is described with reference to FIG. 3 for the situation in which the drone 1 has descent maneuverability compatible with the requirements of the TCAS II system (e.g. a descent rate of more than 500 feet per minute, i.e. about 150 meters per minute) and that this characteristic has been input into the data analysis system 4 in charge of determining the avoidance path. In this particular implementation, when such a drone 1 crosses an intruder aircraft 10 having a TCAS II system and detects a risk of collision, the drone 1, which has previously detected the fact that the intruder aircraft 10 has a TCAS II system, waits for the TCAS II system of the intruder aircraft 10 to transmit a resolution advisory RA (step 27). On receiving this resolution advisory RA, the data analysis system 4 analyses the content of the resolution advisory RA as transmitted by the TCAS II system of the intruder airplane 10 (step 32). If this resolution advisory RA includes an order for the intruder aircraft 10 to climb, the avoidance path determined by the data analysis system 4 is to descent (step 33). Otherwise, the avoidance path comprises turning in a horizontal plane (step 34). The avoidance maneuvers as determined in this way are performed immediately after the RA has been transmitted (steps 35 and 36).

The method in accordance with the second implementation is otherwise identical to the method in accordance with the first implementation.

Figure 4:
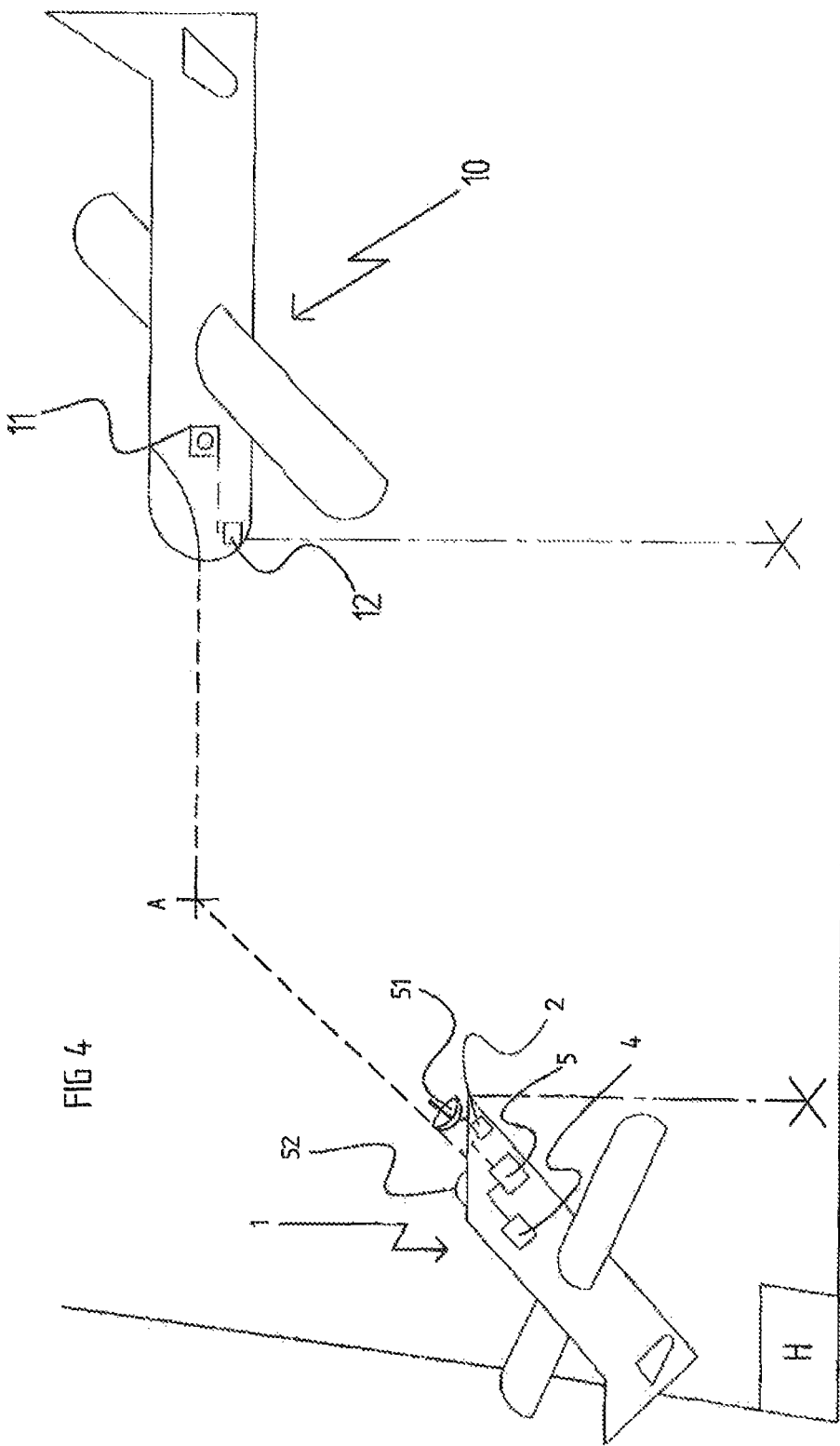
FIG. 4 is a diagrammatic perspective view of a crossing situation between an aircraft and a drone in a third implementation of the invention.
Figure 5:
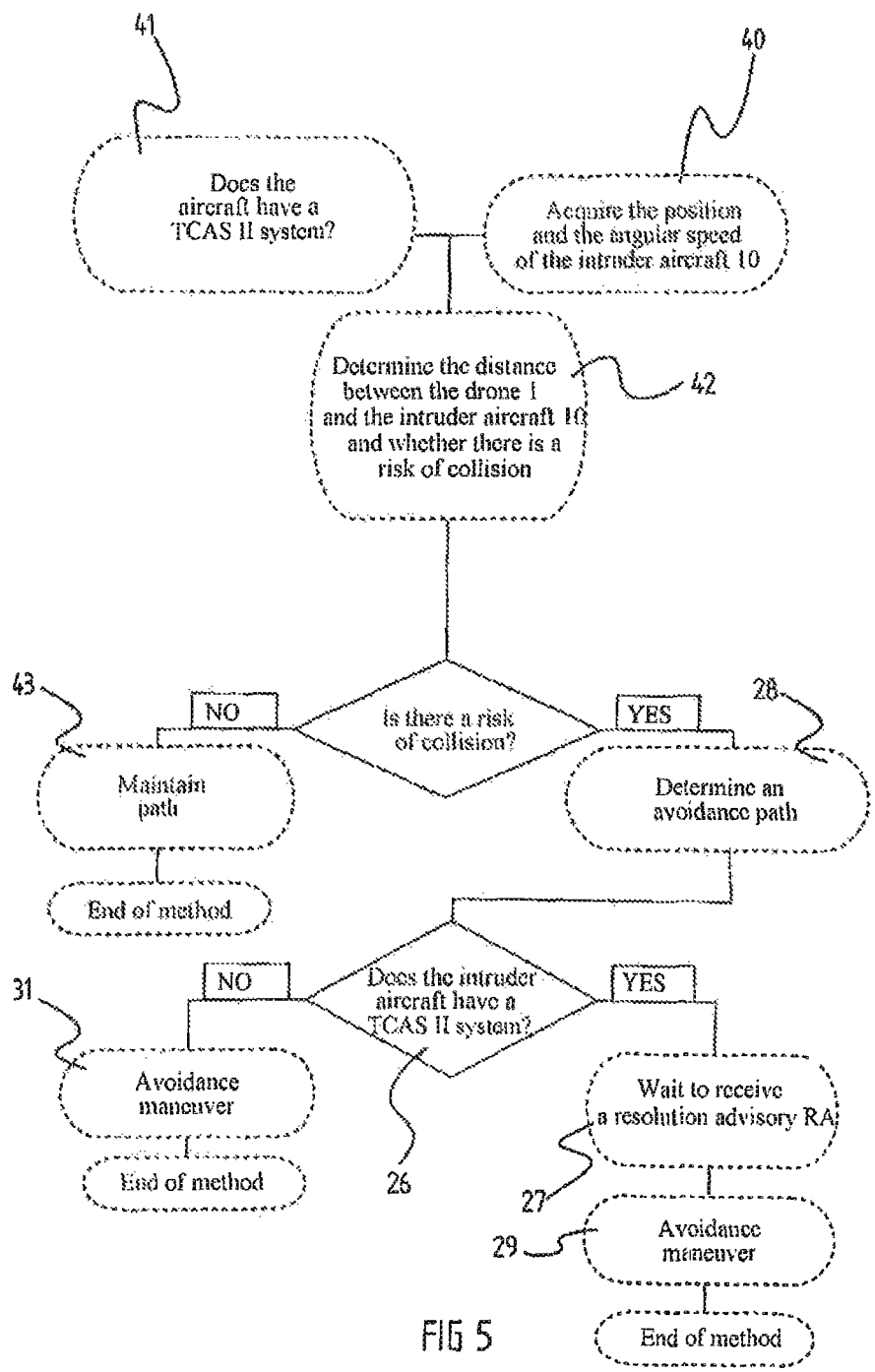
FIG. 5 is a flow chart of events triggered by detecting an intruder airplane in the implementation of FIG. 4.

With reference to FIGS. 4 and 5, there follows a description of a third implementation of the method of the invention. In this implementation, the drone 1 has a mode S transponder 2, an automatic data analysis system 4 connected to a flight control system 5, a radar 51, and only the "reception" portion 52 of the transponder interrogator 13. On entry of the intruder airplane 10 into the detection zone of the radar 51, the radar acquires the position of the intruder aircraft 10, its heading, its speed, its altitude, and its angular speed in a horizontal plane (step 40). Given that the drone 1 cannot interrogate the transponder 12 of the intruder airplane 10, it can only collect, information relating to its position by performing direct measurements. In parallel with these measurements, the "reception" portion 52 of the transponder interrogator 13 listens to the radio environment and can thus receive messages transmitted by the intruder airplane 10 in response to requests from other aircraft or control units on the ground. Those messages may include information about the identity of the aircraft (transmitted by a mode A transponder) and/or its altitude, its heading, its speed, and whether it possesses a TCAS system (transmitted by a mode C transponder). This corresponds to step 41.

On being acquired, this information is processed by the data analysis system 4 in order to determine the distance between the drone 1 and the intruder airplane 10 and whether or not there exists a risk of collision (step 42). This information is continuously updated and steps 40 to 42 are repeated in a loop for each aircraft coming within the range of the radar 51. If no risk of collision is detected, then the drone 1 maintains its initial path (step 43). If a risk of collision is identified, then the analysis system 4 determines an avoidance path (step 44) on the basis of the most recently updated information about the position and the movement of the intruder airplane 10. If the drone 1 has determined that the intruder airplane 10 does not have a TCAS system, then the avoidance maneuver is performed immediately. Otherwise, i.e. if the drone 1 detects that the intruder airplane 10 does have a TCAS system, then the drone maintains its path until the "reception" portion 52 of the transponder interrogator 13 receives a resolution advisory RA. During this period, information about the position of the aircraft and also the steps 40 to 42 of the method are repeated in a loop so as to adapt the avoidance maneuver and the pertinence of performing it to any possible change in the path of the intruder aircraft 10 and/or to the appearance of a second intruder aircraft in the range of the radar 51.

Naturally, the invention is not limited to the implementations described but covers any variant coming within the ambit of the invention as defined by the claims.

In particular:
  although the means for measuring the angular speed of the intruder airplane 10 comprise radio means in the form of direction-finding antennas 3 or a radar 51, the invention is equally applicable to other means for measuring angular speed, such as for example at least one optronic sensor such as a camera, a laser light detection and ranging (Lidar) device, or any other means suitable for measuring the angular speed and enabling the method to be performed;
  although the invention is described with reference to avoiding an airplane, the method of the invention is equally applicable to avoiding other types of aircraft, such as for example dirigible balloons, gliders, or ultralight or microlight aircraft (ULMs);
  although the information transmitted by the drone 1 to the intruder airplane 10 concerning its maneuverability includes, in the example described, the mention "poor maneuverability", the method of the invention is equally applicable to sending other messages about the maneuverability of the drone, such as for example "drone", "not maneuverable", or "descent maneuverability only"; it also being possible for the drone to transmit no information of this type;
  although the position of the intruder aircraft is acquired as described above by collecting information transmitted by its mode C transponder at the request of the drone, or by direct measurement using a radar, the invention is also applicable to acquiring position in other ways, such as for example using at least one optronic sensor such as a camera, a laser lidar, or any other means enabling position to be acquired in a manner appropriate for enabling the method to be performed;
  although the fact of whether or not the intruder aircraft is fitted with a TCAS system is determined as described above by analyzing the response of the intruder airplane to the first interrogation by the transponder of the drone or by listening to transmissions in response to requests from other aircraft or from ground control units, the invention is also applicable to other means of determining whether or not the intruder aircraft has a TCAS system, such as listening with the help of an automatic dependence surveillance-broadcast (ADS-B) receiver;
  although the fact of whether or not the intruder airplane is fitted with a TCAS system is determined as described above during the first interrogation of the intruder airplane by the transponder of the drone, the invention is equally applicable to the fact of whether or not the intruder airplane is fitted with a TCAS system being determined subsequently, e.g. when listening with the help of an ADS-B receiver. The step of determining whether the intruder airplane is or is not fitted with a TCAS system may also be carried out after known Means have determined whether there is a risk of collision, in order to avoid cluttering radio space.

The order in which the steps of the method are performed may be modified relative to the method as described, and for example: the presence of a TCAS on board the intruder aircraft may be determined before determining the position of the intruder aircraft, or before measuring its angular speed.

The invention claimed is:

1. A method enabling an aerial drone not having a TCAS system to avoid an intruder aircraft, the method is performed by a flight control system coupled with a data analysis system performing the following steps:
  acquiring the position of the intruder aircraft in order to determine the distance between the aerial drone and the intruder aircraft;
  measuring the angular speed of the intruder aircraft in a horizontal plane;
  determining whether the intruder aircraft is fitted with a TCAS system, and, if so, receiving a resolution advisory transmitted by the TCAS of the intruder aircraft;
  determining the avoidance path after receiving the resolution advisory, wherein the step of determining an avoidance path includes a prior operation of analyzing the resolution advisory transmitted by the TCAS of the intruder aircraft in such a manner that if the advisory includes an order for the intruder aircraft to climb, the avoidance path comprises descent, and otherwise comprises a turn in a horizontal plane; and the aerial drone performing an avoidance maneuver according to the determined avoidance path to avoid collision with the intruder aircraft.

2. The method according to claim 1, wherein the avoidance path is determined in a horizontal plane.

3. The method according to claim 1, including the additional step of transmitting information to the TCAS of the intruder aircraft about the maneuverability of the aerial drone.

4. The method according to claim 1, wherein, if the intruder aircraft is not fitted with a TCAS system, the avoidance path is determined as soon as possible.

5. The method according to claim 1, wherein the turn in a horizontal plane comprises a turn to the right.

6. The method according to claim 1, wherein the aerial drone includes a data analysis system and the steps of acquiring the position of the intruder aircraft, measuring the angular speed of the aircraft, determining whether the intruder aircraft is fitted with an TCAS system and determining the avoidance path is performed by the data analysis system.

* * * * *